United States Patent [19]

Epron et al.

[11] Patent Number: 5,417,890
[45] Date of Patent: May 23, 1995

[54] CONDUCTIVE MATERIALS BASED ON ENCAPSULATED CONDUCTIVE POLYMERS

[75] Inventors: Florence Epron, Chassereuil du Poitou; François Henry, L'Haye les Rose; Olivier Sagnes, Corbreuse; Jean-Claude Dubois, St. Remy les Chevreuses, all of France

[73] Assignee: Thomson-CSF, Puteaux, France

[21] Appl. No.: 897,828

[22] Filed: Jun. 12, 1992

[30] Foreign Application Priority Data

Jul. 2, 1991 [FR] France ............... 91 08228

[51] Int. Cl.$^6$ ............................................. H01B 1/00
[52] U.S. Cl. .................... 252/500; 252/518; 252/351; 252/357; 523/201; 523/332; 523/352; 428/407
[58] Field of Search ............... 252/500, 518, 351, 357; 523/201, 332, 352; 428/407

[56] References Cited

U.S. PATENT DOCUMENTS

| | | | |
|---|---|---|---|
| 4,481,132 | 11/1984 | Dubois et al. | 252/519 |
| 4,508,639 | 4/1985 | Camps et al. | 252/500 |
| 4,526,706 | 7/1985 | Upson et al. | 252/500 |
| 4,661,576 | 4/1987 | Derobert et al. | 526/298 |
| 4,699,804 | 10/1987 | Miyata et al. | 437/176 |
| 4,824,923 | 4/1989 | Dubois et al. | 536/298 |
| 4,894,263 | 1/1990 | Dubois et al. | 428/1 |
| 4,959,162 | 9/1990 | Armes et al. | 252/500 |
| 5,143,636 | 9/1992 | Gaucher | 252/62.9 |

FOREIGN PATENT DOCUMENTS 017717 10/1980 European Pat. Off. .

OTHER PUBLICATIONS

Journal of Physics D. Applied Physics. vol. 22, 14 Nov. 1989, Letchworth GB pp. 1580–1585; E. C. Cooper, B. Vincent: Electrically conducting organic films and beads based on conductive latex particles.

*Primary Examiner*—Paul Lieberman
*Assistant Examiner*—M. Kopec
*Attorney, Agent, or Firm*—Oblon, Spivak, McClelland, Maier & Neustadt

[57] ABSTRACT

A material based on a conductive polymer consisting of particles of conductive polymer ($P_0$), each particle being wrapped in a shell of water-insoluble, cross-linked polymer ($P_1$).

9 Claims, 2 Drawing Sheets

ORGANIC SOLVENT + SURFACTIVE AGENTS (S₁)

MONOMER (m₁) + RETICULATING AGENT (R)
+ POLYMERIZATION PRIMER AGENT

WASHING + DISPERSION IN A BINDER

ORGANIC SOLVENT

INVERSION OF THE EMULSION

WATER

MONOMER (m$_2$) THEN EVAPORATION OF THE SOLVENT

CONDUCTIVE MATERIALS BASED ON ENCAPSULATED CONDUCTIVE POLYMERS

BACKGROUND OF THE INVENTION

This invention consists of materials with a conductive polymer base, stabilized by encapsulation, and a process to manufacture such materials. These conductive materials, stable and easily dispersed in solution, are currently subject to intense research, for use in paints, particularly absorbent paints used to camouflage aircrafts, due to the absorbent properties of the conductive polymers.

DESCRIPTION OF THE PRIOR ART

At present, conductive polymers can be synthesized by several methods.

The method studied most closely to date is the electrochemical method, which produces polymers with good conductivity performance, but which inevitably produce a ripple film with poor mechanical properties and which cannot exceed 10 to 20 microns in thickness. The efficiencies and quantities involved in this method of synthesis make it difficult to use on an industrial scale. More precisely, electrochemical synthesis is an electropolymerization process during which the polymer develops on an electrode and is made conductive by doping with ions to stabilize conduction. In parallel with the electrochemical method, there is a purely chemical method based on oxidizing polymerization, which produces a conductive powder of submicronic particle size (1 μm to 0.1 μm) with excellent efficiency.

Generally, the reaction protocol places an oxidizing agent, such as $FeCl_3$, $Fe(NO_3)_3$, $Fe(SO_3C_6H_4CH_3)_3$ or $CuCl_2$ in contact with the monomer. The monomer oxidizes and polymerizes in short chains (20 to 50 monomer units). For example, the synthesis of polypyrrole can be initiated using pyrrole and ferric chloride; the redox reaction is as follows:

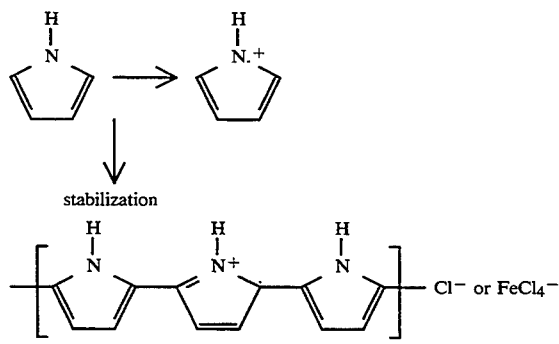

The + charge is delocalized.

The $Fe^{3+}$ ion acts as an oxidizer and primer while the $Cl^-$ or $FeCl_4^-$ ion acts as a dope (to stabilize conductivity). The conductivity obtained with this type of synthesis depends on the reaction medium. Water and acid media give the highest efficiency and good conductivity.

In addition, sodium tosylate or quaternary ammonium co-doping salts can be included in the synthesis process, making the dope more stable and, therefore, giving a polymer with greater thermal and chemical stability and better conductivity.

This synthesis method has the considerable advantages of providing powders which can be used on an industrial scale; however, the conductivity of chemical-produced conductive polymers must be carefully stabilized.

Certain authors have obtained polypyrrole latex sterically stabilized by hydrosoluble polymers such as partially hydrolyzed methylcellulose or polyvinylacetate or again stabilized by electrostatic repulsion by adsorption of polymers containing polar groups such as cellulose sulfonate sodium salt. These types of stabilizers give polypyrrole particles wrapped in surfactive agents which increase the particle stability. Nonetheless, this surfactive envelope is permeable to the environment, does not entirely isolate the particle and only partially contributes to improving its stability.

SUMMARY OF THE INVENTION

Consequently, this invention proposes to wrap the conductive polymer particles in a reticulated hydrosoluble polymer, this wrapping forming a hard shell, completely impermeable to the environment, so that the particles, well stabilized in this way, can also be easily dispersed in any binder to produce a film-generating material. This invention is therefore a material based on conductive polymers which comprises particles of conductive polymer ($P_0$), each particle being wrapped in a shell $C_1$ of reticulated hydrosoluble polymer ($P_1$). Polymer ($P_0$) is preferably a polypyrrole or polythiophene-type polymer. Polymer ($P_1$) may be a polyacrylamide-type polymer. The invention is also a process to manufacture a conductive material comprising particles of conductive polymer ($P_0$) wrapped in reticulated hydrosoluble polymer ($P_1$), this process consisting of the following steps:

Emulsification of an aqueous solution of conductive polymer ($P_0$) particles in a mixture of organic solvent and a hydrophilic surfactive agent ($S_1$) to form a particle ($P_0$) wrapped in a shell of water Ce, this shell of water itself being wrapped in a hydrophilic surfactive agent ($S_1$) dispersed in the organic solvent.

Polymerization, in this emulsion, of a hydrophilic and hydrosoluble monomer ($m_1$) in the presence of a reticulating agent (R) to form particles of polymer ($P_0$), each particle being wrapped in a shell $C_1$ of reticulated hydrosoluble polymer ($P_1$), this shell $C_1$ being insoluble.

The invention is also a conductive polymer-based material which includes particles of conductive polymer ($P_0$), each particle being wrapped in a shell $C_1$ of reticulated hydrosoluble polymer ($P_1$), this shell being surrounded by a shell $C_2$ of film-generating polymer ($P_2$), this last shell itself being wrapped in hydrophobic surfactive agents ($P_2$).

These materials offer particularly advantageous properties since shell $C_1$ stabilizes their conductivity while film-generating shell $C_2$ ensures good mechanical integrity and allows these materials to be used directly without first being redispersed in a binding agent. Polymer $P_2$ can be a butyl styrene-acrylate copolymer and the surfactive agent $S_2$ can be an ethoxyl octyl phenol. The shell of surfactive agents ($S_2$) allows the invented material to be dispersed as required and prevents the aggregation of the shells ($C_2$) of film-generating polymer ($P_2$). The surfactive agents are not necessary for particles ($P_0$) wrapped in shell $C_1$ since the reticulated hydrosoluble polymer shells do not tend to aggregate; in fact, such surfactive agents would impede satisfactory dispersion in a binding agent.

Finally, the invention is a process to manufacture a conductive material consisting of conductive polymer ($P_0$) particles, each particle being wrapped in a shell $C_1$ of reticulated hydrosoluble polymer ($P_1$), itself wrapped in a shell $C_2$ of film-generating polymer ($P_2$), itself wrapped in hydrophobic surfactive agents ($S_2$), the manufacturing process comprising the following steps:

STEP A:

Production, in an organic solvent, of particles ($P_0$) wrapped in polymer ($P_1$), each particle being surrounded by a shell of water $C_e$, itself surrounded by hydrophilic surfactive agents ($S_1$).

STEP B:

Inversion of the emulsion by adding a higher proportion of surfactive agents ($S_2$) than surfactive agents ($S_1$) to obtain particles ($P_O$) wrapped in a shell $C_1$, itself wrapped in a shell of organic solvent $C_0$, wrapped in surfactive agents ($S_2$), the complete product being dispersed in water.

STEP C:

Polymerization, in an emulsion, of hydrophobic monomer ($m_2$), in a shell $C_0$ of organic solvent to produce polymer ($P_0$) particles, each particle being wrapped in a shell $C_1$, itself wrapped in a shell $C_2$ of polymer ($P_2$) produced from monomers ($m_2$), this shell $C_2$ being surrounded by surfactive agents ($S_2$).

BRIEF DESCRIPTION OF THE DRAWINGS

This invention will be better understood and better advantages will become clear upon reading the following description, referring to the appended figures of which.

Figure 1A:
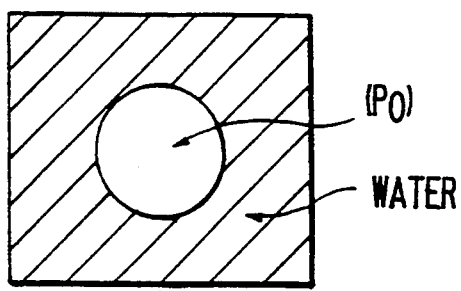
FIG. 1 illustrates the reaction used to produce a film-generating conductive material from particles of conductive polymer ($P_0$) wrapped in reticulated hydrosoluble polymer ($P_1$) complying with the invention.
Figure 1B:
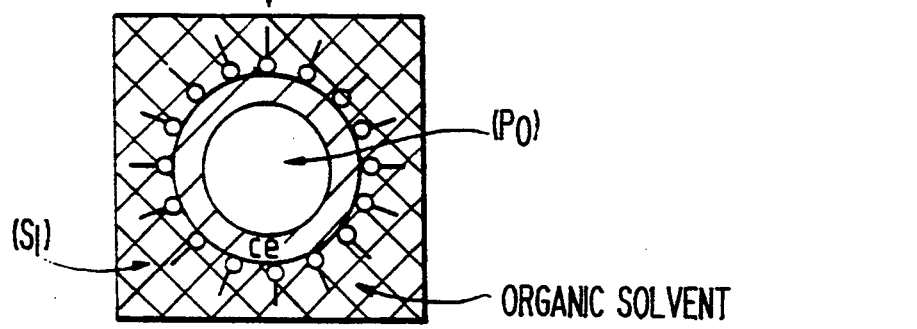
Figure 1C:
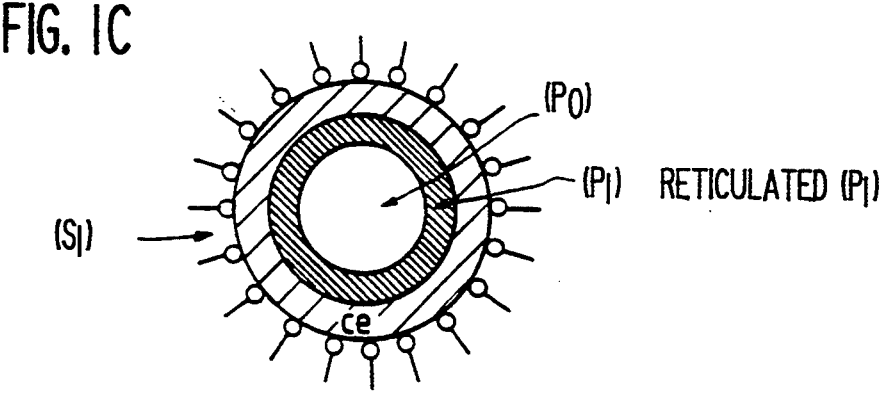
Figure 1D:
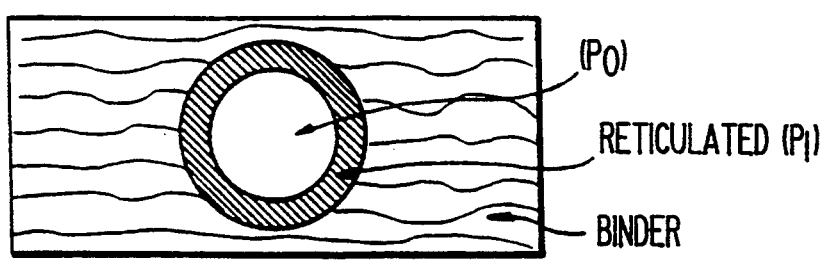

An example of the production of materials complying with the invention using polypyrrole latex particles.

The polypyrrole particles have already been stabilized by methylcellulose and synthesized in the presence of $FeCl_3$. The latex used is concentrated to obtain a solid content of between 6 and 12% by weight. The suspension is ultrasonically vibrated to eliminate, as far as possible, any agglomerates which could have formed during the repeated centrifuging required to wash the suspension. The aqueous suspension is then poured, drop by drop, into a volume of organic medium containing a hydrophilic surfactive agent ($S_1$), sorbitan monooleate. The organic medium chosen is cyclohexane, whose boiling point is less than that of water, and which forms no azeotropes, which makes it easy to eliminate. The emulsion is produced by vigorous agitation at 24,000 rpm. The emulsion obtained is poured into a thermostat-controlled double-skinned reactor fitted with a bead cooler, a thermometer, a nitrogen feed and a mechanical agitator whose speed is accurately controlled. The monomer $m_1$ used for encapsulation is hydrosoluble and hydrophilic. Acrylamide satisfies these requirements, and must be used in conjunction with a reticulating agent (R) to produce a reticulated polymer ($P_1$) which is insoluble in water. This agent can be N—N' methylene-bisacrylamide; a sufficient quantity must be added to avoid the formation of a gel which indicates a partially reticulated polymer.

Initially, the monomer and the reticulating agent, in the form of powder, are poured into a reactor containing the polypyrrole emulsion, in an organic medium, agitated at 480 rpm. When the monomers are first dissolved in the water, before being introduced into the reactor, a second population of particles is formed. It is for this reason that the methylenebisacrylamide and the acrylamide are used in powder form. In this case, an infinitely small part of these products dissolves in the organic medium, the remainder tending to dissolve in the water present on the surface of the particles. This strongly encourages encapsulation. A water-soluble agent to prime the polymerization is then introduced into the reactor. This can be ammonium persulfate. Polymerization is allowed to continue for 2 hours at 45° C. This produces composite particles with the polypyrrole particle in the center and a shell of reticulated polyacrylamide. FIG. 1 illustrates the process used to obtain such encapsulated particles. After washing and drying, these particles can easily be dispersed in a conventional epoxy-type binding agent to produce a conductive polymer-based material whose conductivity is stable and which will generate a film.

In parallel with dispersion in a binder, it is also possible, using particles of polymer $P_0$ encapsulated in polymer $P_1$, to obtain a film-generating material which does not need to be dispersed in a binder. To this end, the particles of polymer ($P_0$) encapsulated in ($P_1$) can be wrapped in a shell $C_2$ of film-generating polymer ($P_2$).

Again using the example of polypyrrole particles wrapped in polyacrylamide surrounded by a water shell $C_e$, itself wrapped in surfactive agents ($S_1$), the complete system being dispersed in an organic solvent, it is again possible to encapsulate shell $C_1$ in a shell $C_2$ of film-generating polymer ($P_2$).

Figure 2A:
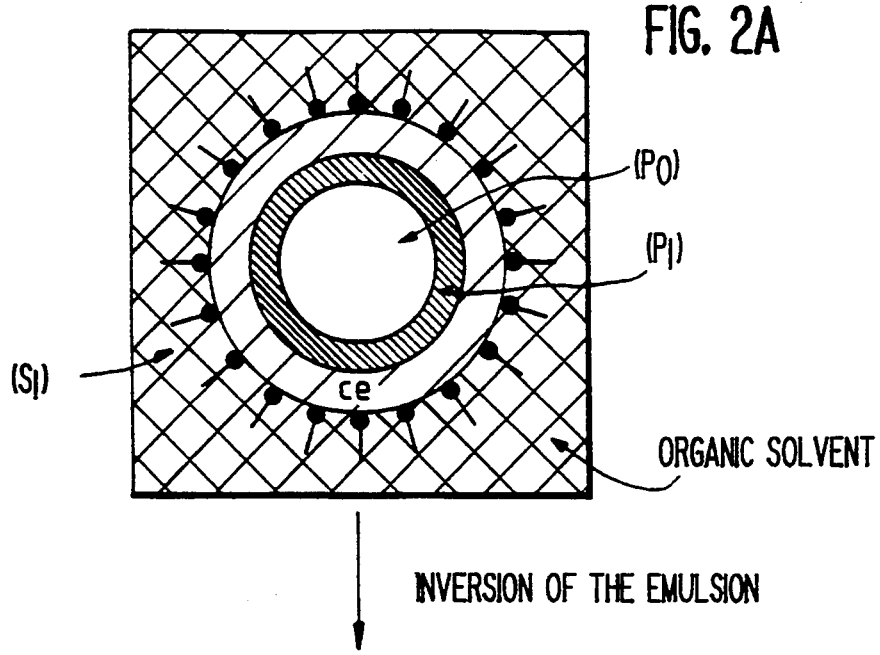
FIG. 2 shows the reaction used to produce the film-generating conductive material employed in the invention from an emulsion of polymer ($P_0$) particles, each particle being wrapped in a shell $C_1$, itself wrapped in a shell of water $C_e$ and hydrophilic surfactive agents ($S_1$). This invention proposes to produce materials containing conductive polymer particles that are highly stabilized by the presence of a hermetic shell of reticulated hydrosoluble polymer ($P_1$). In the prior art, the polymer ($P_0$) particles were only wrapped with methylcellulose-type surfactive agents. To produce the hard shell $C_1$, the invention uses such particles, after prior stabilization, and then encapsulates them in a hydrophilic, hydrosoluble polymer, since various work has shown that conductive polymers were extremely difficult to encapsulate directly in a hydrophobic polymer.
Figure 2B:
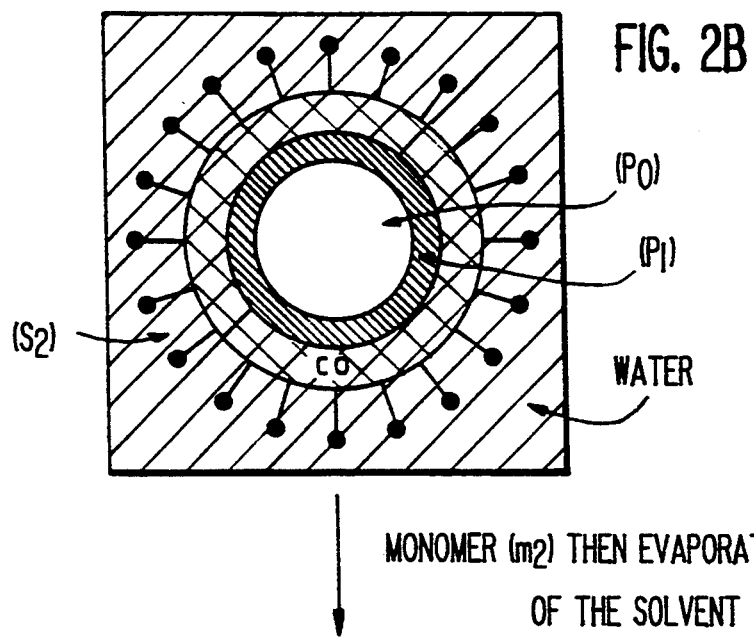
Figure 2C:
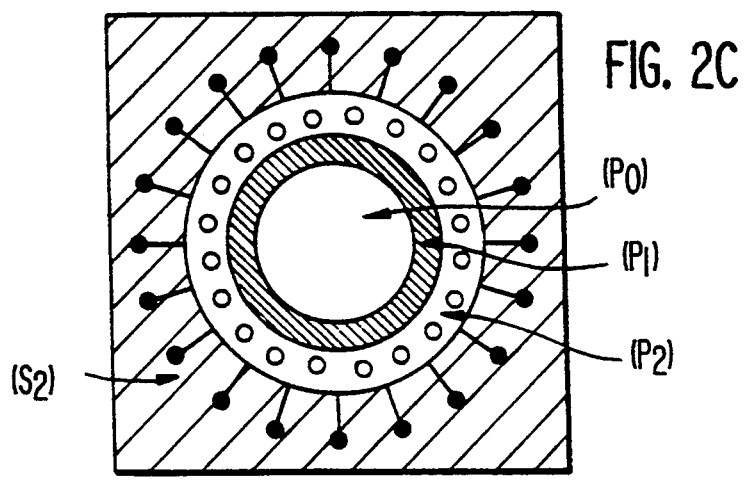

This is done by phase-inversion, to form a shell of organic solvent $C_0$ around shell $C_1$, it then being possible to polymerize a hydrosoluble monomer ($m_2$) in the said shell $C_0$. To do this, the emulsion mentioned previously is poured, drop by drop, into twice the volume of water containing 1.8% of hydrophobic surfactive agents ($S_2$), which can be ethoxyl octyl phenol, agitated at 24,000 rpm. The organic phase which is not trapped in shell $C_0$ is eliminated by evaporation under vacuum. FIG. 2 illustrates the steps in this process.

The inverted emulsion of conductive polymer is diluted to obtain a solid matter content of 3% by weight. It is then poured into a thermostat-controlled reactor, fitted with a bead cooler, a nitrogen feed, a thermometer and a magnetic agitator. The monomers ($m_2$) or comonomers (if a copolymer ($P_2$) is being considered)

are introduced into the reactor under agitation at 600 rpm. They can be polymerized using conventional emulsion polymerization methods to form stable colloidal dispersions of polymers insoluble in water. An example is styrene and butyl acrylate monomers used in equimolar percentage to obtain a film-generating copolymer ($P_2$) at ambient temperature. The monomers ($m_2$) can be selected to adapt the chemical and physical properties of shell $C_2$ and the resultant film-generating material. It is possible to add a charged functional copolymer ($P_3$) to create surface charges which increase the thermodynamic stability given by the surfactive agents; this copolymer ($P_3$) can be a sulfopropylmethacrylate potassium salt. The proportion of hydrophobic monomers relative to the conductive polymer can vary from 30 to 100% by weight.

After the monomers are placed in the reactor, the emulsion is heated to 60° C. and placed under a nitrogen atmosphere. The primer, which can be ammonium persulfate [$(NH_4)_2SO_2$] soluble in water, is added after 1 hour. The reaction takes place at 60° C. for 15 hours, under a nitrogen atmosphere and under agitation at 380 rpm. This produces very stable black latex (life exceeding a year) with a polydispersity with a polydispersivity between 400 and 1000 nm. The conductivity of the polymer particles ($P_0$), wrapped in a shell $C_1$, itself wrapped in surfactant agents ($S_2$), is perfectly stable in an aqueous medium, and this product can be used to manufacture film-generating materials. In fact, films can be obtained by deposing the latex in a mold and allowing the water in the medium to slowly evaporate at ambient temperature.

The latex can then be used as a paint, in which case it has the major advantage of being applicable by electrophoresis, producing a stable film-generating conductive coating on any metal support, even with a very complex surface, whereas conventional paint, applied as a film, does not give the same covering quality.

The conductivity $\sigma$ of films complying with the invention, at a thickness of 1 mm, were evaluated in the microwave range by measuring the dielectric constant $\epsilon''$ for the film losses. Since $\sigma = \omega \epsilon O \epsilon''$, where $\omega$ is the measurement frequency, the results obtained are as summarized in Table 1.

| $\omega$ (Gigahertz) | $\epsilon''$ | $\sigma$ ($10^{-3}$ s/cm) |
| --- | --- | --- |
| 3.0 | 5.3 | 8.8 |

-continued

| $\omega$ (Gigahertz) | $\epsilon''$ | $\sigma$ ($10^{-3}$ s/cm) |
| --- | --- | --- |
| 9.5 | 4.2 | 22.0 |
| 17.0 | 4.1 | 38.0 |

These dielectric properties suggest that these materials would make good electromagnetic absorbent materials or offer excellent anti-static properties.

What is claimed is:

1. A conductive polymer material, comprising:
   particles of a conductive polymer ($P_0$), each particle being wrapped in a continuous shell of water-insoluble, hydrophilic acrylamide polymer ($P_1$), which shell in turn is wrapped in an outer shell of water surrounded by surfactant, and wherein
   said shell of water-insoluble hydrophilic acrylamide polymer is impermeable to the environment.

2. The material of claim 1, wherein the conductive polymer ($P_0$) is a member selected from the group consisting of polypyrrole and polythiophene.

3. The material of claim 1 or 2, wherein polymer ($P_1$) is a polyacrylamide.

4. The material of claim 3, wherein the polyacrylamide is cross-linked by N,N'-methylenebisacrylamide.

5. A conductive polymer material, comprising:
   particles of a conductive polymer ($P_0$), each particle being wrapped in a continuous shell of water-insoluble cross-linked polyacrylamide, which shell in turn is wrapped in an outer shell of water and surfactant, and wherein
   said shell of water-insoluble polyacrylamide is impermeable to the environment.

6. A conductive polymer material, comprising:
   particles of a conductive polymer ($P_0$), each particle being wrapped in a continuous shell of water-insoluble, hydrophilic acrylamide polymer ($P_1$), and an outer shell of a film-generating polymer ($P_2$),
   wherein said shell of water-insoluble hydrophilic acrylamide polymer is impermeable to the environment.

7. The conductive polymer material of claim 6, wherein said outer shell of film-generating polymer ($P_2$) is in turn surrounded by hydrophobic surface active agents ($S_2$).

8. The material of claim 7, wherein polymer ($P_2$) is a butyl styrene-acrylate copolymer.

9. The material of claim 7 or 8, wherein the surface active agent ($S_2$) is ethoxyoctylphenol.

* * * * *